United States Patent
Mengani et al.

(10) Patent No.: US 11,882,635 B1
(45) Date of Patent: Jan. 23, 2024

(54) CORE COMPUTING DEVICE FOR DETECTING ERROR CONDITIONS IN LIGHT EMITTING DIODE (LED) DRIVER CIRCUIT

(71) Applicant: Infineon Technologies AG, Neubiberg (DE)

(72) Inventors: Luca Mengani, Tarragona (ES); Franco Mignoli, Verona (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/301,674

(22) Filed: Apr. 17, 2023

(51) Int. Cl.
- H05B 45/50 (2022.01)
- G06F 11/07 (2006.01)
- H05B 45/30 (2020.01)

(52) U.S. Cl.
CPC ......... *H05B 45/50* (2020.01); *G06F 11/0793* (2013.01); *G06F 11/0796* (2013.01); *H05B 45/30* (2020.01)

(58) Field of Classification Search
None
See application file for complete search history.

(56) References Cited

U.S. PATENT DOCUMENTS

| | | | |
|---|---|---|---|
| 11,324,087 B1* | 5/2022 | Kreuter | H05B 45/14 |
| 11,645,973 B1* | 5/2023 | Li | H05B 45/325 345/212 |
| 2017/0245331 A1* | 8/2017 | Barker | F21V 23/003 |
| 2018/0368223 A1* | 12/2018 | Johnson | H05B 45/00 |
| 2019/0342971 A1* | 11/2019 | Zou | H05B 47/20 |
| 2022/0070985 A1* | 3/2022 | Magic | G01R 31/44 |
| 2022/0312567 A1* | 9/2022 | Tang | H05B 45/46 |

* cited by examiner

*Primary Examiner* — Wilson Lee
(74) *Attorney, Agent, or Firm* — Shumaker & Sieffert, P.A.

(57) ABSTRACT

In some examples, this disclosure describes a light-emitting diode (LED) driver circuit comprising a set of LED drivers, wherein each LED driver of the set of LED drivers is configured to control one or more LEDs of a set of LEDs. Additionally, the LED driver circuit comprises a core computing device configured to receive LED control information, compare primary path LED driver control output data with secondary path LED driver control output data to detect whether one or more error conditions are present in the core computing device, receive channel status feedback information, compare the secondary path LED driver control output data with the channel status feedback information to detect whether one or more error conditions are present in the set of LED drivers or in the set of LEDs, and trigger, based on determining that one or more error conditions are present, one or more remedial actions.

20 Claims, 4 Drawing Sheets

CORE COMPUTING DEVICE FOR DETECTING ERROR CONDITIONS IN LIGHT EMITTING DIODE (LED) DRIVER CIRCUIT

TECHNICAL FIELD

This disclosure relates circuits for driving, controlling, and monitoring light-emitting diodes.

BACKGROUND

Driver circuits are often used to control a voltage, current, or power at a load. For instance, a light-emitting diode (LED) driver may control the power supplied to a string of light-emitting diodes. In some cases, LED driver circuits may accept an input signal including an input current and an input voltage and deliver an output signal including an output current and an output voltage. In some such cases, an LED driver circuit may regulate at least some aspects of the input signal and the output signal, such as controlling the output current emitted by the LED driver circuit. In some examples, processing circuitry may control one or more driver circuits to control a set of LEDs, and monitor one or more parameters associated with the set of LEDs SUMMARY In general, this disclosure is directed to devices, systems, and techniques for using detecting one or more error conditions in a core computing device, a set of light-emitting diode (LED) drivers, and a set of LEDs. For example, the core computing device may receive LED control information from a master computing device that indicates a desired output of the set of LEDs. The core computing device may generate primary path LED driver control output data to control the set of LED drivers to achieve the desired output from the set of LEDs. In some cases, the core computing device may generate secondary path LED driver control output data to compare with the primary path LED driver control data so that the core computing device may determine whether one or more error conditions exist in the core computing device. Additionally, or alternatively, the core computing device may receive channel status feedback information that indicates an actual output of each LED of the set of LEDs. The core computing device may compare channel status feedback information with LED driver output control information in order to determine whether one or more error conditions exist at the set of LED drivers of the set of LEDs that are causing the actual output to differ from the desired output.

The techniques of this disclosure may provide one or more advantages. For example, by using a core computing device to identify error conditions at the core computing device, the set of LED drivers, and the set of LEDs the system may more efficiently identify error conditions as compared with systems that rely on a master computing device to determine error conditions. This is because for the master computing device to identify error conditions, the core computing device needs to relay information back to the master computing device. The need to relay information back to the master computing device for identifying error conditions is eliminated when a core computing device is configured to identify error conditions existing in its own circuitry and identify error conditions existing in a set of LED drivers and a set of LEDs.

In some examples, an LED driver circuit includes a set of LED drivers, wherein each LED driver of the set of LED drivers is configured to control one or more LEDs of a set of LEDs; and a core computing device. The core computing device is configured to receive, from a master computing device, LED control information including a desired output for each LED of the set of LEDs; generate, based on the LED control information, primary path LED driver control output data; generate, based on the LED control information, secondary path LED driver control output data; compare the primary path LED driver control output data with the secondary path LED driver control output data to detect whether one or more error conditions are present in the core computing device; output the primary path LED driver control output to the set of LED drivers to control the set of LED drivers to achieve the desired output for each LED of the set of LEDs; receive channel status feedback information that indicates an output of each LED of the set of LEDs; compare the secondary path LED driver control output data with the channel status feedback information to detect whether one or more error conditions are present in the LED driver or in the set of LEDs; and trigger, based on determining that one or more error conditions are present in the core computing device, in the LED driver, or in the set of LEDs, one or more remedial actions for controlling the set of LED drivers to remedy the one or more error conditions.

In some examples, A method includes receiving, by a core computing device from a master computing device, LED control information including a desired output for each LED of a set of LEDs, wherein each LED driver of a set of LED drivers is configured to control one or more LEDs of the set of LEDs; generating, by the core computing device based on the LED control information, primary path LED driver control output data; generating, by the core computing device based on the LED control information, secondary path LED driver control output data; comparing, by the core computing device, the primary path LED driver control output data with the secondary path LED driver control output data to detect whether one or more error conditions are present in the core computing device; outputting, by the core computing device, the primary path LED driver control output to the set of LED drivers to control the set of LED drivers to achieve the desired output for each LED of the set of LEDs; receiving, by the core computing device, channel status feedback information that indicates an output of each LED of the set of LEDs; comparing, by the core computing device, the secondary path LED driver control output data with the channel status feedback information to detect whether one or more error conditions are present in the LED driver or in the set of LEDs; and triggering, by the core computing device based on determining that one or more error conditions are present in the core computing device, in the LED driver, or in the set of LEDs, one or more remedial actions for controlling the set of LED drivers to remedy the one or more error conditions.

In some examples, an LED driver system includes a master computing device; a set of LED drivers, wherein each LED driver of the set of LED drivers is configured to control one or more LEDs of a set of LEDs; and a core computing device. The core computing device is configured to receive, from the master computing device, LED control information including a desired output for each LED of the set of LEDs; generate, based on the LED control information, primary path LED driver control output data; generate, based on the LED control information, secondary path LED driver control output data; compare the primary path LED driver control output data with the secondary path LED driver control output data to detect whether one or more error conditions are present in the core computing device; output the primary path LED driver control output to the set of LED drivers to control the set of LED drivers to achieve the desired output for each LED of the set of LEDs; receive channel status feedback information that indicates an output of each LED of the set of LEDs; compare the secondary path LED driver control output data with the channel status feedback information to detect whether one or more error conditions are present in the LED driver or in the set of LEDs; and trigger, based on determining that one or more error conditions are present in the core computing device, in the LED driver, or in the set of LEDs, one or more remedial actions for controlling the set of LED drivers to remedy the one or more error conditions.

The summary is intended to provide an overview of the subject matter described in this disclosure. It is not intended to provide an exclusive or exhaustive explanation of the systems, devices, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF THE DRAWINGS

Like reference characters denote like elements throughout the description and figures.

DETAILED DESCRIPTION

Figure 1:
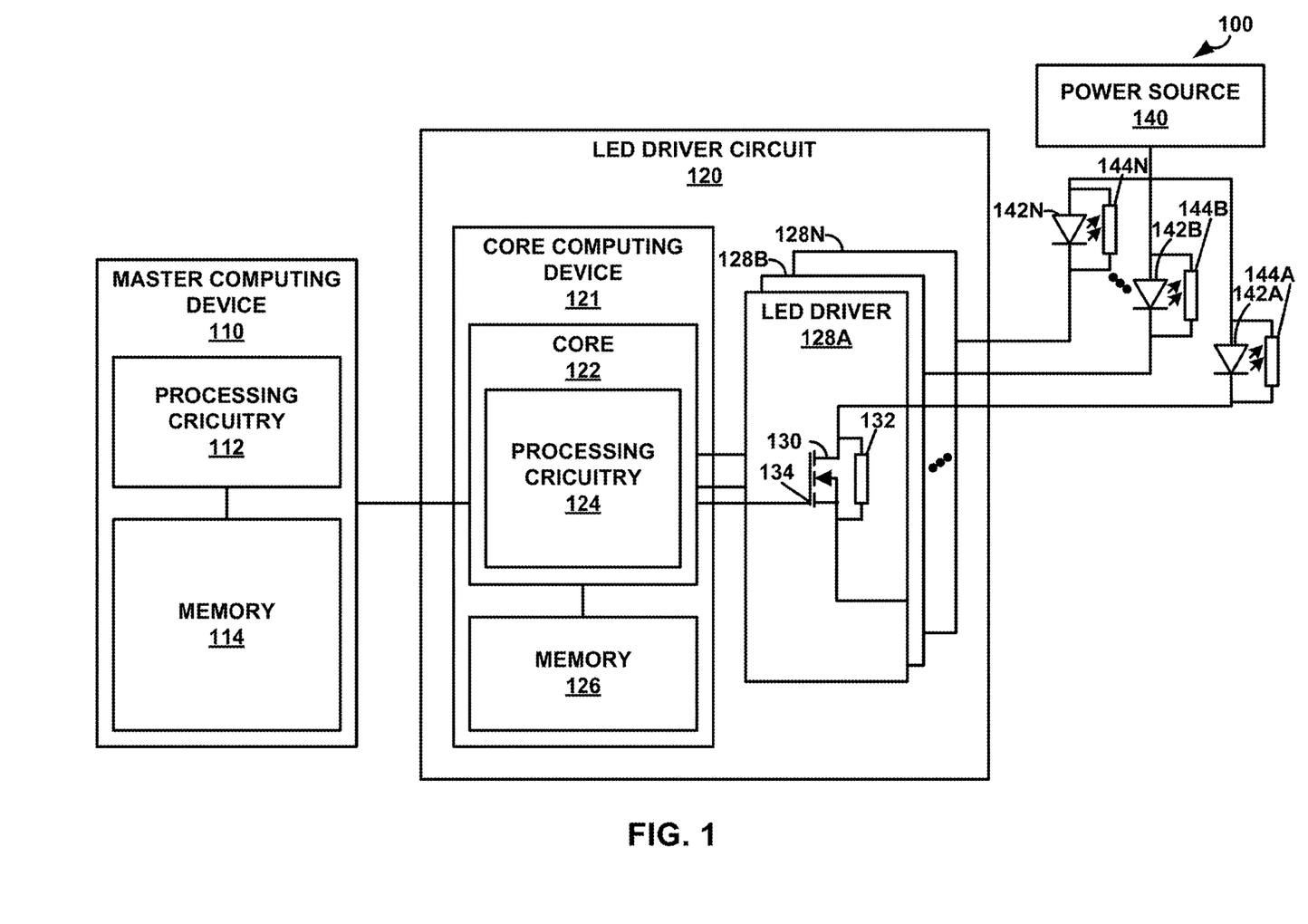
FIG. 1 is a block diagram illustrating a system for controlling and monitoring one or more light-emitting diodes (LEDs), in accordance with one or more techniques of this disclosure.

FIG. 1 is a block diagram illustrating a system 100 for controlling and monitoring one or more light-emitting diodes (LEDs), in accordance with one or more techniques of this disclosure. As seen in FIG. 1, system 100 includes master computing device 110, LED driver circuit 120, Power source 140, and LEDs 142A-142N (collectively, "LEDs 142"). Master computing device 110 includes processing circuitry 112 and memory 114. LED driver circuit 120 includes core computing device 121 including core 122, processing circuitry 124, and memory 126. LED driver circuit 120 also includes LED drivers 128A-128N (collectively, "LED drivers 128"). Each LED driver of LED drivers 128 includes a current sink device, a current sink voltage sensor, and a gate status sensor. For example, LED driver 128A includes current sink device 130, current sink voltage sensor 132, and gate status sensor 134.

Master computing device 110 may include processing circuitry 112. Processing circuitry 112 may include, for example, one or more microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, the processing circuitry 112 of master computing device 110 may include any suitable structure, whether in hardware, software, firmware, or any combination thereof, to perform the functions ascribed herein to system 100.

Master computing device 110 may include a memory 114 in communication with the processing circuitry 112 of master computing device 110. In some examples, the memory 114 in communication with the processing circuitry 112 includes computer-readable instructions that, when executed by the processing circuitry 112, cause system 100 to perform various functions attributed to system 100 herein. The memory 114 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media capable of storing information.

In some examples, master computing device 110 may control LED driver circuit 120 to control LEDs 142 to achieve a desired output. For example, master computing device 110 may control LED driver circuit 120 to control whether each LED of LEDs 142 is activated or deactivated. To achieve the desired output, master computing device 110 may control one or more parameters of each LED of LEDs 142. For example, a duty cycle of an LED may determine an amount of light emitted by the LED. Master computing device 110 may control a duty cycle of each LED of LEDs 142.

Core computing device 121 of LED driver circuit 120 may include processing circuitry 124. Processing circuitry 124 may include, for example, microprocessors, DSPs, ASICs, FPGAs, or equivalent discrete or integrated logic circuitry, or a combination of any of the foregoing devices or circuitry. Accordingly, processing circuitry 124 may include any suitable structure, whether in hardware, software, firmware, or any combination thereof, to perform the functions ascribed herein to system 100.

Core computing device 121 may include a memory 126 in communication with processing circuitry 124. In some examples, the memory 126 in communication with the processing circuitry 124 includes computer-readable instructions that, when executed by processing circuitry 124, cause core computing device 121 to perform various functions attributed to core computing device 121 herein. Memory 126 may include any volatile, non-volatile, magnetic, optical, or electrical media, such as RAM, ROM, NVRAM, EEPROM, flash memory, or any other digital media. In some examples not illustrated in FIG. 1, core computing device 121 includes processing circuitry without including a memory.

LED driver circuit 120 may include one or more LED driver(s) 128. Each LED driver of the LED driver(s) 128 may control whether a respective LED of LEDs 142 is activated or deactivated. In some examples, master computing device 110 may output one or more instructions to core computing device 121 of LED driver circuit 120. Core computing device 121 may control, based on the one or more instructions, LED driver(s) 128. LED driver(s) 128 may control whether each LED 142 is activated or deactivated. In some examples, LED driver(s) 128 may include an LED driver corresponding to each LED of LEDs 142. Each LED driver of LED driver(s) 128 may include circuitry configured to output one or more control signals.

Power source 140 may supply electrical energy to LEDs 142. In some examples, power source 140 includes a battery and a power generation circuit to produce operating power. In some examples, power source 140 is rechargeable to allow extended operation. Power source 140 may include any one or more of a plurality of different battery types, such as nickel cadmium batteries and lithium ion batteries. In some examples, a maximum voltage output of power source 140 is approximately 12V. In some examples, power source 140 supplies power within a range from 10 Watts (W) to 15 W. In some examples, power source 140 represents a power source other than a battery.

In some examples, LEDs 142 may include any one or more suitable semiconductor light sources. In some examples, each LED of LEDs 142 may include a p-n junction configured to emit light when activated. In some examples, LEDs 142 may be included in a headlight assembly for automotive applications. For instance, LEDs 142 may include a matrix, a string, or more than one string of light-emitting diodes to light a road ahead of a vehicle. As used herein, a vehicle may refer to motorcycles, trucks, boats, golf carts, snowmobiles, heavy machines, or any type of vehicle that uses directional lighting. In some examples, LEDs 142 include one or more high beam (HB) LEDs and one or more low beam (LB) LEDs. LED driver circuit 120 may toggle between activating the one or more LB LEDs, activating the one or more HB LEDs, activating both the one or more LB LEDs and the one or more HB LEDs, and deactivating both the one or more LB LEDs and the one or more HB LEDs. LEDs 142 are not limited to including HB LEDs and LB LEDs. LEDs may include any kind of LED, including front automotive LEDs, interior automobile LEDs, rear automotive LEDs, or any combination thereof. LEDs 142 may include any number of LEDs. For example, LEDs 142 may include a number of LEDs within a range from 1 to 100 LEDs.

As seen in FIG. 1, LED driver(s) 128 may each include a current sink device (e.g., LED driver 128A includes current sink device 130). Each current sink device (e.g., current sink device 130) may, in some cases, include a power switch such as, but not limited to, any type of field-effect transistor (FET) including any one or combination of a metal-oxide-semiconductor field-effect transistor (MOSFET), a bipolar junction transistor (BJT), an insulated-gate bipolar transistor (IGBT), a junction field effect transistor (JFET), a high electron mobility transistor (HEMT), or other kinds of elements that use voltage or current for control. Additionally, current sink device 130 may include any one or combination of n-type transistors, p-type transistors, and power transistors. In some examples, current sink device 130 includes vertical transistors, lateral transistors, and/or horizontal transistors. In some examples, current sink device 130 includes other analog devices such as diodes and/or thyristors. In some examples, current sink device 130 may operate as a switch and/or operate as an analog device.

In some examples, current sink device 130 includes three terminals: two load terminals and a control terminal. When current sink device 130 represents a MOSFET, the current sink device may include a drain terminal, a source terminal, and at least one gate terminal, where the control terminal is a gate terminal. When current sink device 130 represents a BJT switch, the control terminal may represent a base terminal. Current may flow between the two load terminals of the current sink device, based on the voltage at the respective control terminal. Therefore, electrical current may flow across the current sink device based on control signals delivered to the control terminal of the current sink device. In one example, if a voltage applied to the control terminal of the current sink device is greater than or equal to a voltage threshold, the current sink device may be activated, allowing the current sink device to conduct electricity.

Furthermore, the current sink device may be deactivated when the voltage applied to the control terminal of the current sink device is below the threshold voltage, thus preventing the current sink device from conducting electricity. Core computing device 121, master computing device 110, or any combination thereof may be configured to control each of current sink device of LED drivers 128.

Each current sink device of LED driver 128 may include various material compounds, such as Silicon, Silicon Carbide, Gallium Nitride, or any other combination of one or more semiconductor materials. In some examples, silicon carbide switches may experience lower switching power losses. Improvements in magnetics and faster switching, such as Gallium Nitride switches, may allow a current sink device to draw short bursts of current. These higher frequency devices may require control signals (e.g., voltage signals delivered to the control terminal of the current sink device) to be sent with more precise timing, as compared to lower-frequency devices.

To control whether each LED of LEDs 142 is activated or deactivated, LED driver circuit 120 may control the current sink device of LED drivers 128 corresponding to the respective LED of LEDs 142. For example, LED driver circuit 120 may control current sink device 130 of LED driver 128A to control LED 142A, LED driver circuit 120 may control a current sink device of LED driver 128B to control LED 142B, and LED driver circuit 120 may control a current sink device of LED driver 128N to control LED 142N.

In some examples, core computing device 121 controls the current sink devices of LED drivers 128 based on instructions received from master computing device 110. LED drivers 128 may include current sink device corresponding to each LED of LEDs 142. For example, core computing device 121 may control a gate terminal of current sink device 130 to control whether LED 142A is activated or deactivated, core computing device 121 may control a gate terminal of a current sink device of LED driver 128B to control whether LED 142B is activated or deactivated, and so on. In some examples, when core computing device 121 controls a current sink device of LED drivers 128 to activate, the LED corresponding to the LED driver emits light. For example, when core computing device 121 activates switching device 130 of LED driver 128A, LED 142A may emit light, when core computing device 121 activates a current sink device of LED driver 128B, LED 142B may emit light, and so on.

Core computing device 121 may receive, from a master computing device 110, LED control information including a desired output for each LED of the set of LEDs 142. In some examples, the desired output for each LED of the set of LEDs 142 may include a desired on/off status for each LED of the set of LEDs 142. For example, the desired output may include that LED 142A occupies an "on" state, LED 142B occupies an "off" state, and so on. In some examples, the desired output may include an intensity of light output corresponding to each LED of LEDs 142. In some examples, the desired output may include a desired color of light output from each LED of the set of LEDs 142. In some examples, the desired output may include one or more symbols, letters, numbers, or any combination thereof to be output from an array of LEDs formed by LEDs 142. In any case, core computing device 121 may control LED drivers 128 to achieve the desired output for LEDs 142.

Processing circuitry 124 of core 122 may generate, based on the LED control information, primary path LED driver control output data and secondary path LED driver control output data. In some examples, the core 122 may generate the primary path LED control information for output to LED drivers 128 to control LEDs 142 to achieve a desired output. In some examples, the core 122 may generate the secondary path LED control information to detect whether one or more error conditions are present in system 100. For example, core 122 may compare the primary path LED control information and the secondary path LED control information in order to determine whether there are one or more differences between the primary path LED control information and the secondary path LED control information. When there are one or more differences between the primary path LED control information and the secondary path LED control information, core 122 may determine whether one or more error conditions present in the core 122 itself.

In some examples, core 122 may generate the primary path LED driver control output data and secondary path LED driver control output data according to a primary path process and a secondary path process, respectively. This may ensure that core 122 s able to determine whether core 122 is making one or more errors in generating the primary path LED control information for output to LED drivers 128. For example, if the secondary path process for generating the secondary path LED driver control output data results in the secondary path LED driver control output data being different from the primary path LED driver control output data generated using the primary path process, this may indicate that core 122 is making one or more errors in generating the primary path LED driver control output data.

Core 122 is configured to output the primary path LED driver control output to the LED drivers 128 to control the LED drivers 128 to achieve the desired output for each LED of the set of LEDs 142. For example, core 122 may output the primary path LED driver control output to control a gate terminal of a current sink device of each LED driver of LED drivers 128. In some examples, core 122 may control a duty cycle of a current sink device of each LED driver of LED drivers 128. In some examples, the duty cycle of a current sink device of an LED driver may determine an amount of light emitted by an LED corresponding to the LED driver.

For example, a duty cycle of current sink device 130 may determine an amount of light emitted by LED 142A. As referred to herein, "duty cycle" may refer to a ratio of time that a current sink device is turned on as compared to turned off. For example, when a duty cycle of current sink device 130 is 0.7, current sink device 130 may alternate between on phases and off phases, where on phases constitute 70% of the total time and off phases constitute 30% of the total time. In this example, LED 142A may likewise alternate between on phases and off phases, where on phases constitute 70% of the total time and off phases constitute 30% of the total time, because whether current sink device 130 is turned on or turned off controls whether LED 142A emits light or does not emit light. In some examples, an LED may emit a greater amount or intensity of light when the duty cycle of the corresponding current sink device is greater as compared to when the duty cycle of the corresponding current sink device is lower.

An LED driver connected to an LED may be referred to herein as an "LED channel." For example, LED driver 128A and LED 142A may form an LED channel, LED driver 128B and LED 142B may form an LED channel, and so on. When current sink device 130 is activated, current may flow from power source 140 through LED 142A and the current sink device 130, causing LED 142A to emit light. When a current sink device of LED driver 128B is activated, current may flow from power source 140 through LED 142B and the current sink device, causing LED 142B to emit light. In this way, an LED channel may include a current pathway for electricity to flow from power source 140 through the LED channel, causing the respective LED to emit light.

In some examples, core 122 may receive, from LED drivers 128 and LEDs 142, channel status feedback information that indicates an actual output of each LED of the set of LEDs 142. In some examples, the channel status feedback information may indicate a status of one or more parts of a set of LED channels. System 100 may include one or more channel status sensors that generate information concerning the status of the one or more parts of a set of LED channels. The channel status sensors may, in some examples, include a set of current sink device status sensors, a set of gate status sensors, and a set of LED status sensors. For example, LED driver 128A includes current sink device status sensor 132 and gate status sensor 134. Current sink device status sensor 132 may be configured to detect a current and/or a voltage across current sink device 130, and gate status sensor may be configured to detect a voltage at a gate terminal of current sink device 130. In this way, Current sink device status sensor 132 and gate status sensor 134 may be configured to generate information indicating whether current sink device 130 is actually turned on or actually turned off, because when current sink device 130, there is a great enough voltage at the gate terminal to activate the switch and electricity flows across current sink device 130. In some examples, each Led driver of LED drivers 128 includes a current sink device status sensor and a gate status sensor configured to generate channel status information corresponding to the respective current sink device.

Each LED status sensor of LED status sensors 144A-144N (hereinafter, "LED status sensors 144") may generate information indicating a current and/or voltage across a respective LED of LEDs 142. For example, LED status sensor 144A may generate information indicating a current and/or a voltage across LED 142A, LED status sensor 144B may generate information indicating a current and/or a voltage across LED 142B, and so on. In this way, LED status sensors 144 may generate information indicating whether current is actually flowing across each LED of LEDs 142, and thus indicating whether each LED of LEDs 142 is actually turned on or turned off. Core 122 may receive channel status information from the current sink device status sensors and gate status sensors of LED drivers 128 and the LED status sensors 144.

Core 122 may compare the secondary path LED driver control output data generated based on the LED control information received from master computing device 110 with the channel status feedback information to detect whether one or more error conditions are present in the LED driver or in the set of LEDs. By comparing the secondary path LED driver control output data with the channel status feedback information, core 122 compares a desired status of LEDs 142 with an actual status of LED drivers 128 and LEDs 142. For example, if the desired status calls for an LED to be turned on, but the LED is actually turned off and/or the LED driver corresponding to the LED is actually turned off, this may indicate that one or more error conditions are present in the LED channel comprising the LED driver and the LED.

Core 122 may trigger, based on determining that one or more error conditions are present in the core computing device 121, in the set of LED drivers 128, or in the set of LEDs 142, one or more remedial actions for controlling the set of LED drivers 128 to remedy the one or more error conditions. By performing a first comparison between the primary path LED driver control output data and the secondary path LED driver control output data and a second comparison between the secondary path LED driver control output data and the channel status feedback information, the core 122 may identify error conditions in each of the core computing device 121 itself, the LED drivers 128, and the LEDs 142. As such, system 100 may detect error conditions more accurately and more efficiently as compared with systems that do not use a core computing device to detect error conditions in the core computing device, LED drivers, and LEDs. In some examples, the remedial actions may include shutting off one or more LED channels associated with an error condition. In some examples, the remedial actions may include outputting a message indicating the one or more error conditions.

In some examples, to trigger the one or more remedial actions to achieve the safe failure reaction, the core computing device 121 is further configured to: monitor data transfer between memory 126 of the core computing device and the set of LED drivers 128 to achieve the safe failure reaction. In some examples, to monitor the data transfer, the core computing device 121 is configured to monitor read and write operations of data stored by the memory 126 of the core computing device 121. In some examples, core computing device 121 is configured to insert one or more checkpoints in supervised code exercised by the core computing device 121 to monitor whether the supervised code includes an incorrect program sequence or an incorrect execution time interval.

Figure 2:
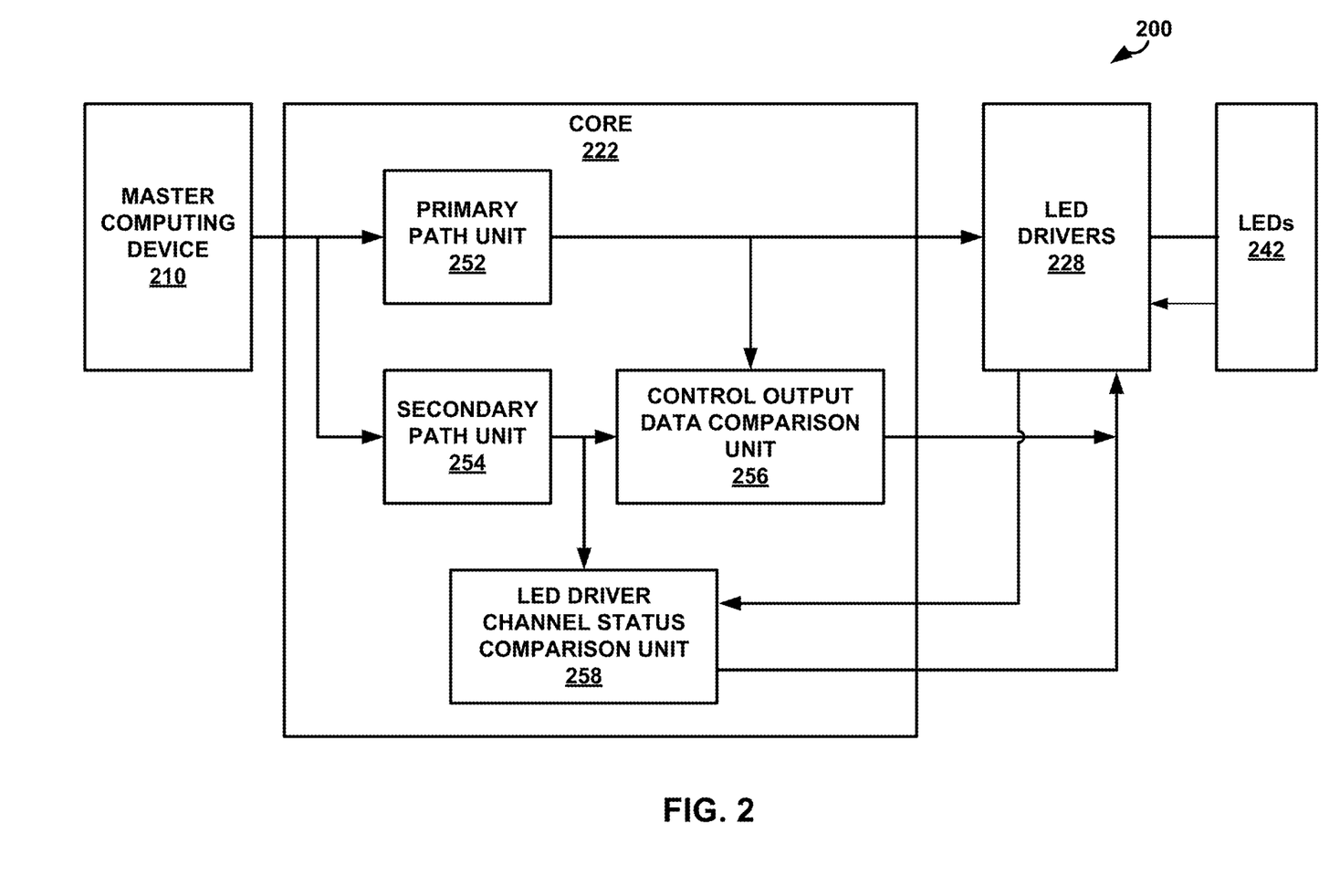
FIG. 2 is a block diagram illustrating a system including an example core including a primary path and a secondary path, in accordance with one or more techniques of this disclosure.

FIG. 2 is a block diagram illustrating a system 200 including an example core 222 including a primary path and a secondary path, in accordance with one or more techniques of this disclosure. As seen in FIG. 2, system 200 includes master computing device 210, core 222, LED driver(s) 228, and LEDs 242. Master computing device 210 may be an example of master computing device 110 of FIG. 1. Core 222 may be an example of core 122 of FIG. 1. LED drivers 228 may be an example of LED drivers 128 of FIG. 1. LEDs 242 may be an example of LEDs 142 of FIG. 142. Core 222 includes primary path unit 252, secondary path unit 254, control output data comparison unit 256, and LED driver channel status comparison unit 258. In some examples, core 222 may be part of processing circuitry of a core computing device or may be executed by processing circuitry of a core computing device.

In some examples, Core 222 may represent an automotive safety integrity level (ASIL) core. ASIL may represent a safety standard for automotive electronics, including LED righting. In some examples, core 222 may ensure that a desired output for LEDs 242 that complies with ASIL is actually implement. Core 222 may ensure that the desired output for LEDs 242 is implemented by comparing LED control information generated by a primary path and a secondary redundant path of core 222 and comparing LED control information generated by core 222 with channel status information received by LED drivers 228 and LEDs 242.

Core 222 may receive, from master computing device 210, LED control information including a desired output for each LED of LEDs 242. In some examples, the desired output may include specific indications for a desired status of each LED of LEDs 242, but this is not required. In some examples, the desired output may represent a collective desired status for the set of LEDs 242, and core 222 may determine a desired status for each individual LED of the set of LEDs.

In some examples, primary path unit 252 may generate, based on the LED control information received from master computing device 110, primary path LED driver control output data. Primary path unit 252 may generate the primary path LED driver control output data for output to LED drivers 228 to control LEDs 242 to achieve the desired output. For example, primary path unit 252 may generate instructions for controlling each LED driver of LED drivers 228 to control an output of each LED of LEDs 242. The primary path LED driver control output data may control whether each LED of LEDs 242 emits light, an amount of light emitted by each LED of LEDs 242, a color of light emitted by each LED of LEDs 242, or any combination thereof.

The primary path LED driver control output data may, in some cases, include a duty cycle corresponding to a current sink device of each LED driver of LED drivers 228. The duty cycle corresponding to the current sink device of each LED driver of LED drivers 228 may determine an amount of light emitted by each LED of LEDs 242. For example, a first current sink device of a first LED driver having a first duty cycle may cause a first LED of LEDs 242 to emit a first amount of light and a second current sink device of a second LED driver having a second duty cycle may cause a second LED of LEDs 242 to emit a second amount of light. The first amount of light may be greater than the second amount of light if the first duty cycle is greater than the second duty cycle, and the second amount of light may be greater than the first amount of light if the second duty cycle is greater than the first duty cycle.

In some examples, secondary path unit 254 may generate, based on the LED control information received from master computing device 110, secondary path LED driver control output data. In some examples, the secondary path unit 254 may correspond to a redundant path of core 222 that is configured to generate information for detecting error conditions. A redundant path is a duplication of a function of a system configured to increase a reliability of the system as compared with systems that do not include a redundant path. For example, primary path unit 252 and secondary path unit 254 may be configured to generate a same or a substantially similar output. In some examples, an output from primary path unit 252 and an output from secondary path unit 254 generated based on the same LED control information received from master computing device 110 may cause the LED drivers 228 to control LEDs 242 to achieve the same output.

When one or more error conditions are present in core 222, there may be one or more differences between the primary path LED driver control output data from primary path unit 252 and the secondary path LED driver control output data from secondary path unit 254. That is, when one or both of primary path unit 252 and secondary path unit 254 make one or more errors in generating the primary path LED driver control output data and the secondary path LED driver control output data, respectively, this may result in there being one or more differences between the primary path LED driver control output data and the secondary path LED driver control output data.

Control output data comparison unit 256 may compare the primary path LED driver control output data from primary path unit 252 and the secondary path LED driver control output data from secondary path unit 254 to determine whether there are one or more differences between the primary path LED driver control output data and the secondary path LED driver control output data. In some examples, a difference may be present between the primary path LED driver control output data and the secondary path LED driver control output data when the primary path LED driver control output data and the secondary path LED driver control output data would cause the LEDs 242 to achieve different outputs.

Since the LED control information includes a single desired output for LEDs 242, and since primary path unit 252 and secondary path unit 252 both generate instructions based on the single desired output, the primary path LED driver control output data and the secondary path LED driver control output data achieve the same output from LEDs 242 when no error conditions are present in core 222. But when one or more error conditions are present in core 222, this may cause there to be one or more differences between the primary path LED driver control output data and the secondary path LED driver control output data. When control output data comparison unit 256 detects one or more differences between the primary path LED driver control output data and the secondary path LED driver control output data, control output data comparison unit 256 may determine that one or more error conditions are present in core 222.

In some examples, to detect one or more differences between the primary path LED driver control output data and the secondary path LED driver control output data, control output data comparison unit 256 may determine whether, for each LED of LEDs 242, the primary path LED driver control output data and the secondary path LED driver control output data would cause the respective LED to achieve a different output. The primary path LED driver control output data and the secondary path LED driver control output data would cause an LED of LEDs 242 to achieve a different output, this may indicate that an error condition is present in core 222. In some examples, a different output may represent a difference in whether the respective LED would emit light or would not emit light, a difference in an amount of light that the LED would emit, a difference in a color of light emitted by the LED, or any combination thereof based on a difference between the primary path LED driver control output data and the secondary path LED driver control output data.

Based on determining that there are one or more error conditions present in core 222, control output data comparison unit 256 may trigger one or more remedial actions to remedy the one or more error conditions. In some examples, a remedial action may include outputting an instruction to disable one or more LEDs of LEDs 242 that are associated with an error condition. For example, when the primary path LED driver control output data and the secondary path LED driver control output data would cause an LED of LEDs 242 to achieve a different output, control output data comparison unit 256 may trigger a remedial action by outputting an instruction to LED drivers 228 to permanently disable the LED of LEDs 242. In some examples, a remedial action may include outputting a message to master computing device 210 that one or more errors are present in core 222.

Core 222 may receive channel status information corresponding to an actual status of a set of LED channels. In some examples, an LED channel may include an LED driver of LED drivers 228 connected to an LED of LEDs 242. An actual status of an LED channel may include whether the LED of the LED channel is emitting light, an amount of light emitted by the LED of the LED channel, whether a current sink device of an LED driver of the LED channel is activated or deactivated, whether a gate terminal of the current sink device is receiving enough voltage to activate the current sink device, or any combination thereof. One or more channel status sensors may be present in LED drivers 228 and LEDs 242. Core 222 may receive the channel status information from the channel status sensors of LED drivers 228 and LEDs 242.

In some examples, LED driver channel status comparison unit 258 may receive the channel status information from the channel status sensors of LED drivers 228 and LEDs 242. LED driver channel status comparison unit 258 may compare the channel status information with the secondary path LED driver control output data to determine whether one or more differences exist between an actual status of the LED channels and a desired output indicated by the secondary path LED driver control output data. When one or more differences exist between an actual status of the LED channels and the desired output, this may indicate that there are one or more error conditions present in the LED drivers 228 or the LEDs.

In some examples, to detect one or more differences between the actual status of the LED channels and a desired output from the LEDs 242 of the LED channels, LED driver channel status comparison unit 258 may determine whether, for each LED of LEDs 242, the secondary path LED driver control output data would cause the respective LED channel to occupy a different status. If the secondary path LED driver control output data would cause LED channel to occupy a different status, this may indicate that an error condition is present in the LED channel. In some examples, LED driver channel status comparison unit 258 may trigger, based on determining that one or more error conditions are present in the core 222, in the set of LED drivers 228, or in the set of LEDs 242, one or more remedial actions for controlling the set of LED drivers 228 so that LEDs 242 deliver a desired output.

Figure 3:
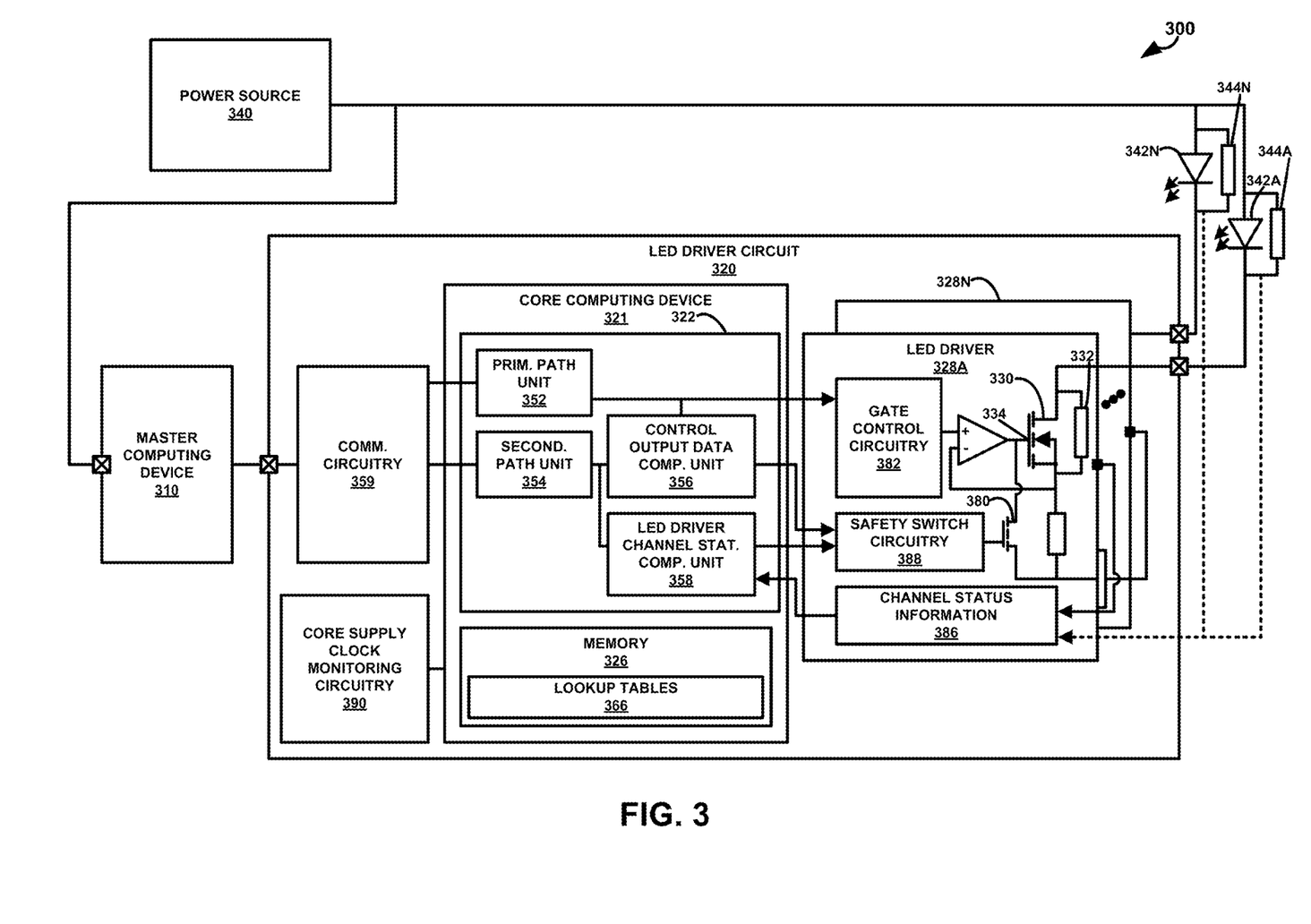
FIG. 3 is a block diagram illustrating a system including a safety mechanism for deactivating one or more LEDs, in accordance with one or more techniques of this disclosure.

FIG. 3 is a block diagram illustrating a system 300 including a safety mechanism for deactivating one or more LEDs, in accordance with one or more techniques of this disclosure. As seen in FIG. 3, system 300 includes master computing device 310, LED driver circuit 320, power source 340, LEDs 342A-342N (collectively, "LEDs 342"), and LED status sensors 344A-344N (hereinafter, "LED status sensors 344"). LED driver circuit 320 includes core computing device 321, LED drivers 328A-328N (collectively, "LED drivers 328"), communication circuitry 359, and core supply clock monitoring circuitry 390. Core computing device 321 includes core 322 and memory 326. Core 322 includes primary path unit 352, secondary path unit 354, control output data comparison unit 356, LED driver channel status comparison unit 358. Memory 326 is configured to store lookup tables 366. LED driver 328A includes current sink device 330, current sink device status sensor 332, gate status sensor 334, safety switch 380, gate control circuitry 382, channel status information 386, and safety switch circuitry 388.

In some examples, each LED driver of LED drivers 328 may include a current sink device, a current sink device status sensor, a gate status sensor, a safety switch, a gate control circuitry, a channel status information, and a safety switch circuitry. In some examples, system 300 includes a set of LED channels. Each LED channel of the set of LED channels may correspond to an LED driver connected to an LED. For example, a first LED channel may correspond to LED driver 328A connected to LED 342A, and an nth LED channel may correspond to LED driver 328N connected to LED 342N.

In some examples, master computing device 310 may be an example of master computing device 110 of FIG. 1. In some examples, LED driver circuit 320 may be an example of LED driver circuit 120 of FIG. 1. In some examples, core computing device 321 may be an example of core computing device 121 of FIG. 1. In some examples, core 322 is an example of core 122 of FIG. 1. In some examples, LED drivers 328 may represent an example of LED drivers 128 of FIG. 1. In some examples, current sink device 330 may represent an example of current sink device 130 of FIG. 1. In some examples, current sink device status sensor 332 is an example of current sink device status sensor 132 of FIG. 1. In some examples, gate status sensor 334 is an example of gate status sensor 134 of FIG. 1. In some examples, power source 340 may be an example of power source 140 of FIG. 1. In some examples, LEDs 342 may be an example of LEDs 142 of FIG. 1. In some examples, LED status sensors 344 may be an example of LED status sensors 144 of FIG. 1. In some examples, memory 326 may be an example of memory 126 of FIG. 1. In some examples, primary path unit 352 is an example of primary path unit 252 of FIG. 2. In some examples, secondary path unit 354 is an example of secondary path unit 254 of FIG. 2. In some examples, control output data comparison unit 356 is an example of control output data comparison unit 256 of FIG. 2. In some examples, LED driver channel status comparison unit 358 is an example of LED driver channel status comparison unit 258 of FIG. 2.

Master computing device 310 and/or LED driver circuit 320 may, in some cases, be configured to control the one or more LED channels corresponding to LED drivers 328 and LEDs 342. Master computing device 310 may transmit LED control information to LED driver circuit 320 via communication circuitry 359. The LED control information may be for controlling LEDs 342 to emit a desired output. For example, core computing device 321 may receive the LED control information from master computing device 310 via communication circuitry 359.

In some examples, core computing device 321 may control LED drivers 328 to control LEDs 342 to achieve the desired output. Each LED driver of LED drivers 328 may include a current sink device connected to an LED of LEDs 342. Current sink device 330 of LED driver 328A, for example, is connected to LED 342A. This means that when current sink device 330 is activated, current may flow from power source 340 across LED 342A and across current sink device 330. When current sink device 330 is deactivated, current may not flow from power source 340 across LED 342A and across current sink device 330. Core computing device 321 may control current sink device 330 and current sink devices of other LED drivers to be turned on or to be turned off in order to control whether each LED of LEDs 342 emits light or does not emit light.

Core 322 may, in some examples, generate LED driver control output data based on the LED control information received from the master computing device 310 for output to LED drivers 328. In some examples, core 322 may generate the LED driver control output data to achieve the desired output indicated by the LED control information. For example, primary path unit 352 may generate primary path LED driver control output data for output to LED drivers 328 to control LEDs 342 to achieve the desired output indicated by the LED control information received from master computing device 310. In some examples, the primary path LED driver control output data may include instructions for whether each current sink device of LED drivers 328 is to be turned on or turned off. In some examples, the primary path LED driver control output data may include a duty cycle corresponding to each current sink device of LED drivers 328.

Primary path unit 352 may output the primary path LED driver control output data to LED drivers 328. For example, to control current sink device 330, primary path unit 352 may output the primary path LED driver control output data to gate control circuitry 382 of LED driver 328A. In some examples, each LED driver of LED drivers 328 includes gate control circuitry and primary path unit 352 may output primary path LED driver control output data to gate control circuitry of each LED driver of LED drivers 328. Gate control circuitry 382 may control, based on the primary path LED driver control output data, a gate terminal of current sink device 330 in order to control whether the current sink device 330 is turned on or turned off.

In some examples, secondary path unit 354 may generate secondary path LED driver control output data based on the LED control information received from the master computing device 310. In some examples, secondary path unit 354 may correspond to a redundant path of core 322 that is configured to generate an output that is the same as an output from primary path unit 352. In some examples, first data may be the same as second data when the first data and the second data both would cause LED drivers 328 to control LEDs 342 to achieve the same output when no error conditions are present in the system.

Control output data comparison unit 356 may compare the primary path LED driver control output data generated by primary path unit 352 with the secondary path LED driver control output data generated by the secondary path unit 354 in order to determine whether one or more error conditions are present in core computing device 321. For example, when control output data comparison unit 356 detects one or more differences between the primary path LED driver control output data and the secondary path LED driver control output data, this may indicate that one or more error conditions are present in core computing device 321. For example, when one or more error conditions are present in primary path unit 352, this may cause primary path unit 352 to generate an output that is different from an output generated by secondary path unit 354. Additionally, or alternatively, when one or more error conditions are present in secondary path unit 354, this may cause secondary path unit 354 to generate an output that is different from an output generated by primary path unit 352.

In some examples, core computing device 321 is configured to receive channel status information 386 that indicates an actual status of each LED channel of the set of LED channels corresponding to LED drivers 328 and LEDs 342. In some examples, one or more channel status sensors may collect channel status information 386. For example, the one or more channel status sensors may, in some examples, include a set of current sink device status sensors, a set of gate status sensors, and a set of LED status sensors. Each LED driver of LED drivers 328 may include a current sink device status sensor and a gate sensor. For example, LED driver 328A includes current sink device status sensor 332 and gate status sensor 334. Current sink device status sensor 332 may indicate a current and/or a voltage across current sink device 330. Gate status sensor 334 may indicate a voltage at a gate terminal of current sink device 332. Each LED status sensor of LED status sensors 344 may indicate a current and/or a voltage across an LED of LEDs 342.

In some examples, channel status information 386 generated by the one or more channel status sensors may indicate whether one or more error conditions are present in LED drivers 328 and LEDs 342. For example, when a voltage at a gate terminal of current sink device 330 is higher than a threshold for activating current sink device 330 but current is not flowing across current sink device 330, this may indicate that an error condition is present. For example, a short connection may divert current away from current sink device 330 such that current does not flow across current sink device 330 even when the gate terminal receives voltage sufficient to turn on current sink device 330.

LED driver channel status comparison unit 358 may compare the channel status information 386 with the secondary path LED driver control output data generated by the secondary path unit 354 in order to determine whether one or more error conditions are present in LED drivers 328 or LEDs 342. In some examples, LED driver channel status comparison unit 358 may determine that one or more error conditions are present in LED drivers 328 or LEDs 342 based on one or more differences between the secondary path LED driver control output data and the channel status information 386. For example, when the secondary path LED driver control output data indicates that a desired output includes LED driver 328A controlling current switch device 330 so that LED 342A emits light, then current sink device status sensor 332 should indicate that current is flowing across current sink device 330, gate status sensor 334 should indicate that the gate terminal is receiving enough voltage to activate current sink device 330, and LED status sensor 344A should indicate that current is flowing across LED 342A.

Based on determining that one or more error conditions are present in the core computing device 321, the set of LED drivers 328, or the LEDs 342, core computing device 321 may trigger one or more remedial actions for controlling the LED drivers 328 to remedy the one or more error conditions. For example, when control output comparison unit 356 detects one or more error conditions present in core computing device 321, control output comparison unit 356 may trigger one or more remedial actions to remedy the one or more error conditions. When an error condition present in core computing device 321 is associated with an LED channel corresponding to LED driver 328A and LED 342A, control output comparison unit 356 may output an instruction to safety switch circuitry 388 to activate safety switch 380. Activating safety switch 380 may cause current sink device 330 to deactivate and cause LED 342A not to emit light.

When LED driver channel status comparison unit 358 detects one or more error conditions present in LED drivers 328 or LEDs 342, LED driver channel status comparison unit 358 may trigger one or more remedial actions to remedy the one or more error conditions. When an error condition is present in an LED channel corresponding to LED driver 328A and LED 342A, LED driver channel status comparison unit 358 may output an instruction to safety switch circuitry 388 to activate safety switch 380. Activating safety switch 380 may cause current sink device 330 to deactivate and cause LED 342A not to emit light.

There may be one or more other remedial actions other than activating safety switch 380. In some examples, core computing device 321 may output a message to master computing device indicating one or more error conditions detected by control output data comparison unit 356 and/or LED driver channel status comparison unit 358. In some examples, output data comparison unit 356 and/or LED driver channel status comparison unit 358 may generate instructions for output to gate control circuitry 382 to remedy one or more error conditions.

Core supply clock monitoring circuitry 390 may be configured to monitor a condition of core computing device 321. Core supply clock monitoring circuitry 390 may be configured to verify that one or more error conditions are not present in core computing device 321. For example, core supply clock monitoring circuitry 390 may be configured to send a message to core computing device 321 with a request to verify that core computing device 321 is online. Core supply clock monitoring circuitry 390 may receive a reply from core computing device 321 verifying that core computing device 321 is online. If core supply clock monitoring circuitry 390 does not receive a reply, core supply clock monitoring circuitry 390 may determine that one or more error conditions are present in core computing device 321. In some examples, core supply clock monitoring circuitry 390 is configured to monitor a power supply of core computing device 321. In some examples, core supply clock monitoring circuitry 390 is configured to monitor a clock of core computing device.

Figure 4:
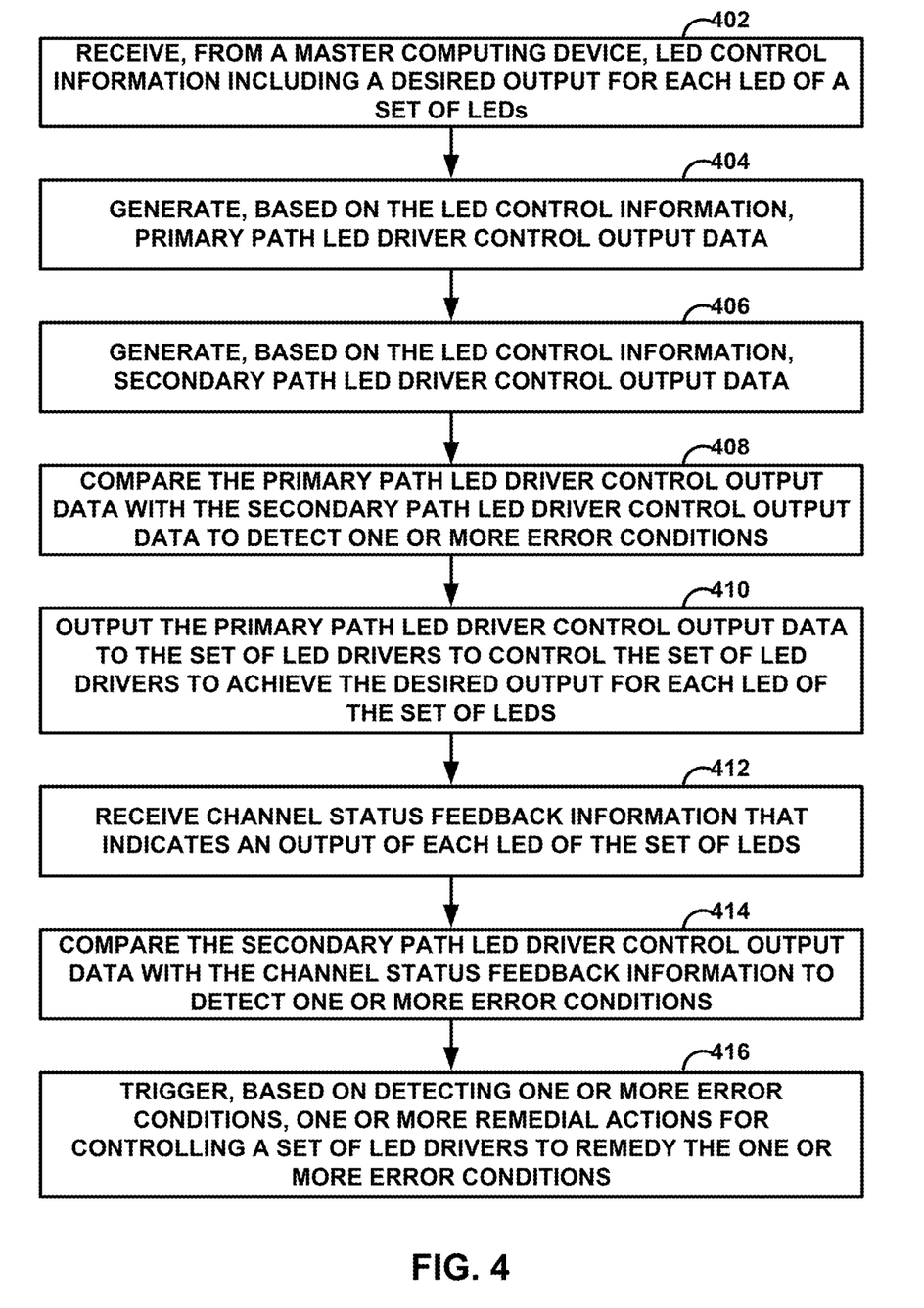
FIG. 4 is a flow diagram illustrating an example technique for detecting one or more error conditions and triggering one or more remedial actions, in accordance with one or more techniques of this disclosure.

FIG. 4 is a flow diagram illustrating an example technique for detecting one or more error conditions and triggering one or more remedial actions, in accordance with one or more techniques of this disclosure. FIG. 4 is described with respect to system 300 of FIG. 3. However, the techniques of FIG. 4 may be performed by different components of system 300 or by additional or alternative systems.

As shown in the example of FIG. 4, core computing device 321 may receive, from master computing device 310, LED control information including a desired output for each LED of the set of LEDs 342 (402). In some examples, the desired output for each LED of the set of LEDs 342 may include a desired on/off status for each LED of the set of LEDs 342. In some examples, the desired output may include an intensity of light output corresponding to each LED of LEDs 342. In some examples, the desired output may include a desired color of light output from each LED of the set of LEDs 342. In some examples, the desired output may include one or more symbols, letters, numbers, or any combination thereof to be output from an array of LEDs formed by LEDs 342. In any case, core computing device 321 may control LED drivers 328 to achieve the desired output for LEDs 342.

Primary path unit 352 may generate, based on the LED control information, primary path LED control output data (404). Secondary path unit 354 may generate, based on the LED control information, secondary path LED control output data (406). Control output data comparison unit 356 may compare the primary path LED control output data and the secondary path LED control output data to detect one or more error conditions (408). In some examples, control output data comparison unit 356 may detect one or more error conditions when one or more differences exist between the primary path LED control output data and the secondary path LED control output data. Primary path unit 352 may output the primary path LED driver control unit output data to the set of LED drivers 328 to control the set of LED drivers 328 to achieve the desired output for each LED of the set of LEDs (410).

LED driver channel status comparison unit 358 may receive channel status feedback information that indicates an output of each LED of LEDs 342 (412). In some examples, the channel status information indicates an actual status of each LED channel of a set of LED channels. LED driver channel status comparison unit 358 may compare the secondary path LED control output data with the channel status feedback information to detect one or more error conditions (414). Core computing device 321 may trigger, based on detecting one or more error conditions, one or more remedial actions for controlling the set of LED drivers 328 to remedy the one or more error conditions (416).

The following numbered clauses may demonstrate one or more aspects of the disclosure.

Clause 1: A light-emitting diode (LED) driver circuit comprising: a set of LED drivers, wherein each LED driver of the set of LED drivers is configured to control one or more LEDs of a set of LEDs; and a core computing device. The core computing device is configured to: receive, from a master computing device, LED control information including a desired output for each LED of the set of LEDs; generate, based on the LED control information, primary path LED driver control output data; generate, based on the LED control information, secondary path LED driver control output data; compare the primary path LED driver control output data with the secondary path LED driver control output data to detect whether one or more error conditions are present in the core computing device; output the primary path LED driver control output to the set of LED drivers to control the set of LED drivers to achieve the desired output for each LED of the set of LEDs; receive channel status feedback information that indicates an output of each LED of the set of LEDs; compare the secondary path LED driver control output data with the channel status feedback information to detect whether one or more error conditions are present in the set of LED drivers or in the set of LEDs; and trigger, based on determining that one or more error conditions are present in the core computing device, in the set of LED drivers, or in the set of LEDs, one or more remedial actions for controlling the set of LED drivers to remedy the one or more error conditions.

Clause 2: The LED driver circuit of clause 1, wherein the core computing device is configured to trigger the one or more remedial actions to achieve a safe failure reaction.

Clause 3: The LED driver circuit of clause 2, wherein to trigger the one or more remedial actions to achieve the safe failure reaction, the core computing device is further configured to: monitor data transfer between a memory of the core computing device and the set of LED drivers to achieve the safe failure reaction; and trigger the one or more remedial actions based on the data transfer.

Clause 4: The LED driver circuit of clause 3, wherein to monitor the data transfer, the core computing device is configured to monitor read and write operations of data stored by the memory of the core computing device.

Clause 5: The LED driver circuit of clause 1, wherein the core computing device is further configured to insert one or more checkpoints in supervised code exercised by the core computing device to monitor whether the supervised code includes an incorrect program sequence or an incorrect execution time interval.

Clause 6: The LED driver circuit of clause 1, wherein the channel status feedback information indicates an actual output of each LED of the set of LEDs, wherein to detect whether one or more error conditions are present in the core computing device, the core computing device is configured to detect whether there are one or more differences between the primary path LED driver control output data and the secondary path LED driver control output data, and wherein to detect whether one or more error conditions are present in the set of LED drivers or in the set of LEDs, the core computing device is configured to detect whether there are one or more differences between the actual output of each LED of the set of LEDs indicated by the channel status feedback information and the desired output for each LED of the set of LEDs indicated by the secondary path LED driver control output data.

Clause 7: The LED driver circuit of clause 1, wherein each LED driver of the set of LED drivers comprises: a current sink device connected in series with an LED of the set of LEDs; and one or more channel status sensors, wherein the core computing device is configured to receive the channel status feedback information from the one or more channel status sensors, and wherein to control the set of LED drivers, the core computing device is configured to control the current sink device of each LED driver of the set of LED drivers.

Clause 8: The LED driver circuit of clause 7, wherein to trigger the one or more remedial actions, the core computing device is configured to control the current sink device of each LED driver of the set of LED drivers to achieve a safe failure reaction.

Clause 9: The LED driver circuit of clause 7, wherein to control the set of LED drivers, the core computing device is configured to control a duty cycle corresponding to the current sink device of each LED driver of the set of LED drivers so that the set of LEDs emit the desired output.

Clause 10: The LED driver circuit of clause 7, wherein to receive the channel status feedback information, the core computing device is configured to: receive, from the one or more channel status sensors of each LED driver of the set of LED drivers, a gate signal that indicates whether a gate terminal of the current sink device of the respective LED driver is activated or deactivated; receive, from the one or more channel status sensors of each LED driver of the set of LED drivers, an output voltage signal that indicates a voltage output from a respective LED; and receive, from the one or more channel status sensors of each LED driver of the set of LED drivers, an LED voltage signal that indicates a voltage across a respective LED.

Clause 11: The LED driver circuit of clause 1, wherein the primary path LED driver control output data comprises quality management (QM) information, and wherein the secondary path LED driver control output data comprises automotive safety integrity level (ASIL) information.

Clause 12: A method comprising: receiving, by a core computing device from a master computing device, LED control information including a desired output for each LED of a set of LEDs, wherein each LED driver of a set of LED drivers is configured to control one or more LEDs of the set of LEDs; generating, by the core computing device based on the LED control information, primary path LED driver control output data; generating, by the core computing device based on the LED control information, secondary path LED driver control output data; comparing, by the core computing device, the primary path LED driver control output data with the secondary path LED driver control output data to detect whether one or more error conditions are present in the core computing device; outputting, by the core computing device, the primary path LED driver control output to the set of LED drivers to control the set of LED drivers to achieve the desired output for each LED of the set of LEDs; receiving, by the core computing device, channel status feedback information that indicates an output of each LED of the set of LEDs; comparing, by the core computing device, the secondary path LED driver control output data with the channel status feedback information to detect whether one or more error conditions are present in the set of LED drivers or in the set of LEDs; and triggering, by the core computing device based on determining that one or more error conditions are present in the core computing device, in the set of LED drivers, or in the set of LEDs, one or more remedial actions for controlling the set of LED drivers to remedy the one or more error conditions.

Clause 13: The method of clause 12, wherein the method further comprises triggering the one or more remedial actions to achieve a safe failure reaction.

Clause 14: The method of clause 13, wherein triggering the one or more remedial actions to achieve the safe failure reaction comprises: monitoring, by the core computing device, data transfer between a memory of the core computing device and the set of LED drivers to achieve the safe failure reaction; and triggering, by the core computing device, the one or more remedial actions based on the data transfer.

Clause 15: The method of clause 14, wherein monitoring the data transfer comprises monitoring, by the core computing device, read and write operations of data stored by the memory of the core computing device.

Clause 16: The method of clause 12, wherein the channel status feedback information indicates an actual output of each LED of the set of LEDs, wherein detecting whether one or more error conditions are present in the core computing device comprises detecting, by the core computing device, whether there are one or more differences between the primary path LED driver control output data and the secondary path LED driver control output data, and wherein detecting whether one or more error conditions are present in the set of LED drivers or in the set of LEDs comprises detecting, by the core computing device, whether there are one or more differences between the actual output of each LED of the set of LEDs indicated by the channel status feedback information and the desired output for each LED of the set of LEDs indicated by the secondary path LED driver control output data.

Clause 17: The method of clause 12, wherein each LED driver of the set of LED drivers comprises: a current sink device connected in series with an LED of the set of LEDs; and one or more channel status sensors, wherein the method further comprises receiving, by the core computing device, the channel status feedback information from the one or more channel status sensors, and wherein controlling the set of LED drivers comprises controlling, by the core computing device, the current sink device of each LED driver of the set of LED drivers.

Clause 18: The method of clause 17, wherein triggering the one or more remedial actions comprises controlling, by the core computing device, the current sink device of each LED driver of the set of LED drivers to achieve a safe failure reaction.

Clause 19: The method of clause 17, wherein receiving the channel status feedback information comprises: receiving, by the core computing device from the one or more channel status sensors of each LED driver of the set of LED drivers, a gate signal that indicates whether a gate terminal of the current sink device of the respective LED driver is activated or deactivated; receiving, by the core computing device from the one or more channel status sensors of each LED driver of the set of LED drivers, an output voltage signal that indicates a voltage output from a respective LED; and receiving, by the core computing device from the one or more channel status sensors of each LED driver of the set of LED drivers, an LED voltage signal that indicates a voltage across a respective LED.

Clause 20: A light-emitting diode (LED) driver system comprising: a master computing device; a set of LED drivers, wherein each LED driver of the set of LED drivers is configured to control one or more LEDs of a set of LEDs; and a core computing device. The core computing device is configured to: receive, from the master computing device, LED control information including a desired output for each LED of the set of LEDs; generate, based on the LED control information, primary path LED driver control output data; generate, based on the LED control information, secondary path LED driver control output data; compare the primary path LED driver control output data with the secondary path LED driver control output data to detect whether one or more error conditions are present in the core computing device; output the primary path LED driver control output to the set of LED drivers to control the set of LED drivers to achieve the desired output for each LED of the set of LEDs; receive channel status feedback information that indicates an output of each LED of the set of LEDs; compare the secondary path LED driver control output data with the channel status feedback information to detect whether one or more error conditions are present in the set of LED drivers or in the set of LEDs; and trigger, based on determining that one or more error conditions are present in the core computing device, in the set of LED drivers, or in the set of LEDs, one or more remedial actions for controlling the set of LED drivers to remedy the one or more error conditions.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include RAM, ROM, programmable read only memory (PROM), erasable programmable read only memory (EPROM), EEPROM, flash memory, a hard disk, a CD-ROM, a floppy disk, a cassette, magnetic media, optical media, or other computer readable media.

Various examples have been described. These and other examples are within the scope of the following claims.

What is claimed is:

1. A light-emitting diode (LED) driver circuit comprising:
a set of LED drivers, wherein each LED driver of the set of LED drivers is configured to control one or more LEDs of a set of LEDs; and a core computing device configured to:
receive, from a master computing device, LED control information including a desired output for each LED of the set of LEDs;
generate, based on the LED control information, primary path LED driver control output data;
generate, based on the LED control information, secondary path LED driver control output data;
compare the primary path LED driver control output data with the secondary path LED driver control output data to detect whether one or more error conditions are present in the core computing device;
output the primary path LED driver control output to the set of LED drivers to control the set of LED drivers to achieve the desired output for each LED of the set of LEDs;
receive channel status feedback information that indicates an output of each LED of the set of LEDs;
compare the secondary path LED driver control output data with the channel status feedback information to detect whether one or more error conditions are present in the set of LED drivers or in the set of LEDs; and
trigger, based on determining that one or more error conditions are present in the core computing device, in the set of LED drivers, or in the set of LEDs, one or more remedial actions for controlling the set of LED drivers to remedy the one or more error conditions.

2. The LED driver circuit of claim 1, wherein the core computing device is configured to trigger the one or more remedial actions to achieve a safe failure reaction.

3. The LED driver circuit of claim 2, wherein to trigger the one or more remedial actions to achieve the safe failure reaction, the core computing device is further configured to:
monitor data transfer between a memory of the core computing device and the set of LED drivers to achieve the safe failure reaction; and
trigger the one or more remedial actions based on the data transfer.

4. The LED driver circuit of claim 3, wherein to monitor the data transfer, the core computing device is configured to monitor read and write operations of data stored by the memory of the core computing device.

5. The LED driver circuit of claim 1, wherein the core computing device is further configured to insert one or more checkpoints in supervised code exercised by the core computing device to monitor whether the supervised code includes an incorrect program sequence or an incorrect execution time interval.

6. The LED driver circuit of claim 1, wherein the channel status feedback information indicates an actual output of each LED of the set of LEDs,
wherein to detect whether one or more error conditions are present in the core computing device, the core computing device is configured to detect whether there are one or more differences between the primary path LED driver control output data and the secondary path LED driver control output data, and
wherein to detect whether one or more error conditions are present in the set of LED drivers or in the set of LEDs, the core computing device is configured to detect whether there are one or more differences between the actual output of each LED of the set of LEDs indicated by the channel status feedback information and the desired output for each LED of the set of LEDs indicated by the secondary path LED driver control output data.

7. The LED driver circuit of claim 1,
wherein each LED driver of the set of LED drivers comprises:
a current sink device connected in series with an LED of the set of LEDs; and
one or more channel status sensors,
wherein the core computing device is configured to receive the channel status feedback information from the one or more channel status sensors, and
wherein to control the set of LED drivers, the core computing device is configured to control the current sink device of each LED driver of the set of LED drivers.

8. The LED driver circuit of claim 7, wherein to trigger the one or more remedial actions, the core computing device is configured to control the current sink device of each LED driver of the set of LED drivers to achieve a safe failure reaction.

9. The circuit of claim 7, wherein to control the set of LED drivers, the core computing device is configured to control a duty cycle corresponding to the current sink device of each LED driver of the set of LED drivers so that the set of LEDs emit the desired output.

10. The LED driver circuit of claim 7, wherein to receive the channel status feedback information, the core computing device is configured to:
receive, from the one or more channel status sensors of each LED driver of the set of LED drivers, a gate signal that indicates whether a gate terminal of the current sink device of the respective LED driver is activated or deactivated;
receive, from the one or more channel status sensors of each LED driver of the set of LED drivers, an output voltage signal that indicates a voltage output from a respective LED; and
receive, from the one or more channel status sensors of each LED driver of the set of LED drivers, an LED voltage signal that indicates a voltage across a respective LED.

11. The LED driver circuit of claim 1, wherein the primary path LED driver control output data comprises quality management (QM) information, and wherein the secondary path LED driver control output data comprises automotive safety integrity level (ASIL) information.

12. A method comprising:
receiving, by a core computing device from a master computing device, LED control information including a desired output for each LED of a set of LEDs, wherein each LED driver of a set of LED drivers is configured to control one or more LEDs of the set of LEDs;
generating, by the core computing device based on the LED control information, primary path LED driver control output data;
generating, by the core computing device based on the LED control information, secondary path LED driver control output data;
comparing, by the core computing device, the primary path LED driver control output data with the secondary path LED driver control output data to detect whether one or more error conditions are present in the core computing device;
outputting, by the core computing device, the primary path LED driver control output to the set of LED drivers to control the set of LED drivers to achieve the desired output for each LED of the set of LEDs;

receiving, by the core computing device, channel status feedback information that indicates an output of each LED of the set of LEDs;

comparing, by the core computing device, the secondary path LED driver control output data with the channel status feedback information to detect whether one or more error conditions are present in the set of LED drivers or in the set of LEDs; and triggering, by the core computing device based on determining that one or more error conditions are present in the core computing device, in the set of LED drivers, or in the set of LEDs, one or more remedial actions for controlling the set of LED drivers to remedy the one or more error conditions.

13. The method of claim 12, wherein the method further comprises triggering the one or more remedial actions to achieve a safe failure reaction.

14. The method of claim 13, wherein triggering the one or more remedial actions to achieve the safe failure reaction comprises:

monitoring, by the core computing device, data transfer between a memory of the core computing device and the set of LED drivers to achieve the safe failure reaction; and triggering, by the core computing device, the one or more remedial actions based on the data transfer.

15. The method of claim 14, wherein monitoring the data transfer comprises monitoring, by the core computing device, read and write operations of data stored by the memory of the core computing device.

16. The method of claim 12, wherein the channel status feedback information indicates an actual output of each LED of the set of LEDs, wherein detecting whether one or more error conditions are present in the core computing device comprises detecting, by the core computing device, whether there are one or more differences between the primary path LED driver control output data and the secondary path LED driver control output data, and wherein detecting whether one or more error conditions are present in the set of LED drivers or in the set of LEDs comprises detecting, by the core computing device, whether there are one or more differences between the actual output of each LED of the set of LEDs indicated by the channel status feedback information and the desired output for each LED of the set of LEDs indicated by the secondary path LED driver control output data.

17. The method of claim 12, wherein each LED driver of the set of LED drivers comprises:

a current sink device connected in series with an LED of the set of LEDs; and one or more channel status sensors, wherein the method further comprises receiving, by the core computing device, the channel status feedback information from the one or more channel status sensors, and wherein controlling the set of LED drivers comprises controlling, by the core computing device, the current sink device of each LED driver of the set of LED drivers.

18. The method of claim 17, wherein triggering the one or more remedial actions comprises controlling, by the core computing device, the current sink device of each LED driver of the set of LED drivers to achieve a safe failure reaction.

19. The method of claim 17, wherein receiving the channel status feedback information comprises:

receiving, by the core computing device from the one or more channel status sensors of each LED driver of the set of LED drivers, a gate signal that indicates whether a gate terminal of the current sink device of the respective LED driver is activated or deactivated;

receiving, by the core computing device from the one or more channel status sensors of each LED driver of the set of LED drivers, an output voltage signal that indicates a voltage output from a respective LED; and receiving, by the core computing device from the one or more channel status sensors of each LED driver of the set of LED drivers, an LED voltage signal that indicates a voltage across a respective LED.

20. A light-emitting diode (LED) driver system comprising:

a master computing device;

a set of LED drivers, wherein each LED driver of the set of LED drivers is configured to control one or more LEDs of a set of LEDs; and a core computing device configured to:

receive, from the master computing device, LED control information including a desired output for each LED of the set of LEDs;

generate, based on the LED control information, primary path LED driver control output data;

generate, based on the LED control information, secondary path LED driver control output data;

compare the primary path LED driver control output data with the secondary path LED driver control output data to detect whether one or more error conditions are present in the core computing device;

output the primary path LED driver control output to the set of LED drivers to control the set of LED drivers to achieve the desired output for each LED of the set of LEDs;

receive channel status feedback information that indicates an output of each LED of the set of LEDs;

compare the secondary path LED driver control output data with the channel status feedback information to detect whether one or more error conditions are present in the set of LED drivers or in the set of LEDs; and trigger, based on determining that one or more error conditions are present in the core computing device, in the set of LED drivers, or in the set of LEDs, one or more remedial actions for controlling the set of LED drivers to remedy the one or more error conditions.

\* \* \* \* \*